(12) United States Patent
Coulombe

(10) Patent No.: US 8,118,107 B2
(45) Date of Patent: Feb. 21, 2012

(54) HORSESHOE

(76) Inventor: Robert W. Coulombe, Fort Erie (CA)

( * ) Notice: Subject to any disclaimer, the term of this patent is extended or adjusted under 35 U.S.C. 154(b) by 8 days.

(21) Appl. No.: 12/428,504

(22) Filed: Apr. 23, 2009

(65) Prior Publication Data

US 2009/0288844 A1 Nov. 26, 2009

Related U.S. Application Data

(60) Provisional application No. 61/125,257, filed on Apr. 23, 2008.

(51) Int. Cl.
*A01L 3/00* (2006.01)

(52) U.S. Cl. .............................................. 168/4; 168/17

(58) Field of Classification Search ................. 168/4, 12, 168/13

See application file for complete search history.

(56) References Cited

U.S. PATENT DOCUMENTS

| | | | | |
|---|---|---|---|---|
| 142,097 A | * | 8/1873 | Goodenough | 168/4 |
| 3,302,723 A | * | 2/1967 | Renkenberger et al. | 168/4 |
| 3,310,115 A | * | 3/1967 | Ward | 168/4 |
| 4,972,909 A | * | 11/1990 | Rose | 168/4 |
| 5,121,798 A | * | 6/1992 | Lindh | 168/12 |
| 6,729,411 B2 | * | 5/2004 | Kerckhaert | 168/4 |

FOREIGN PATENT DOCUMENTS

| | | | |
|---|---|---|---|
| FR | 2647637 A1 | * | 12/1990 |
| JP | 2007135482 A | * | 6/2007 |
| WO | WO 2004047526 A1 | * | 6/2004 |

* cited by examiner

*Primary Examiner* — Son T Nguyen
(74) *Attorney, Agent, or Firm* — The Weintraub Group, P.L.C.

(57) ABSTRACT

The present invention provides an improved horseshoe, which comprises a hoof engagement surface that is provided with an unevenness and makes contact with the hoof in such a manner that the shoe will fit more closely to and immovably against the bottom of the hoof. The unevenness provides an anti-slip interference with fibrous material of the hoof to lessen relative movement between the horseshoe and the hoof, both during assembly thereto by a farrier and during galloping of the horse, desirably inhibiting shearing stresses being placed on the securement nails. The anti-slip interference is provided by an array of bumps or hemispherical shaped domes that project upwardly from the hoof-engaging surface to displace fibrous hoof material and complete an interlocking engagement therewith in an amount sufficient to inhibit relative movement but not create discomfort to the horse.

14 Claims, 2 Drawing Sheets

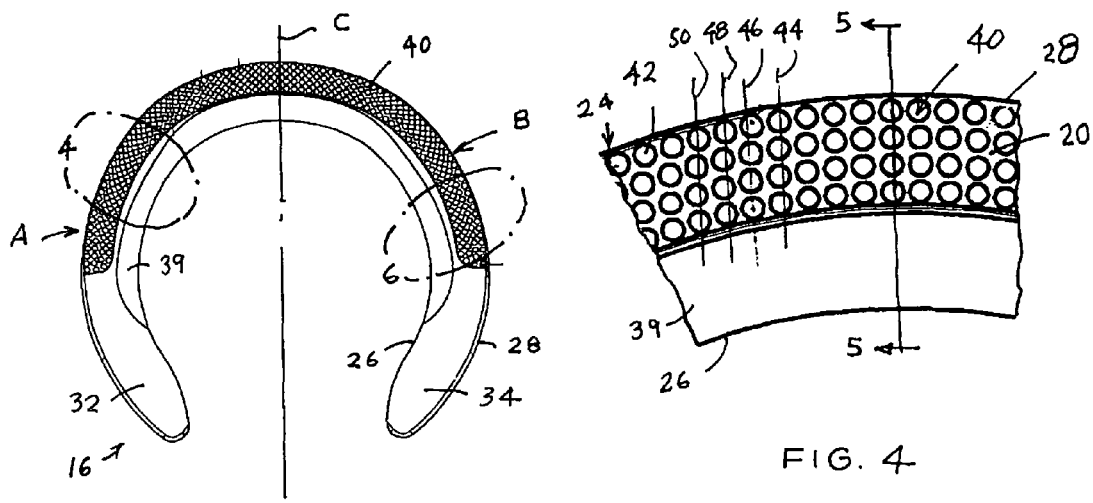
FIG. 3
FIG. 4
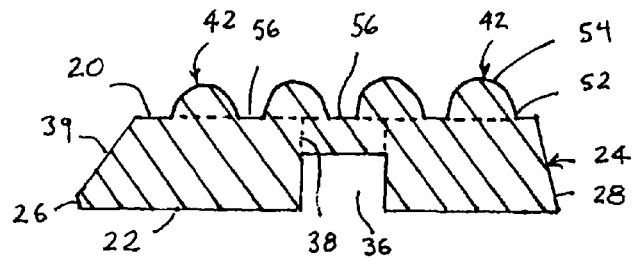
FIG. 5
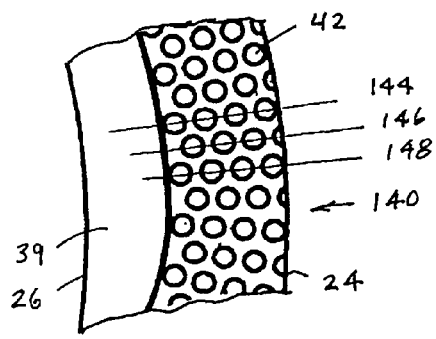
FIG. 6

HORSESHOE

CROSS-REFERENCE TO RELATED APPLICATION

This application is a completion application of U.S. Provisional Patent Application Ser. No. 61/125,257, filed Apr. 23, 2008, for "Horseshoe," the entire disclosure of which is hereby incorporated by reference.

BACKGROUND OF THE INVENTION

1. Field of the Invention

The present invention pertains to an improved securement of a horseshoe a horse's hoof and more particularly to a horseshoe wherein the upper hoof-engaging surface of the horseshoe is configured with a slip resistant structure in the form of an array of hemi-spherical or dome like protuberances which engage the hoof material to inhibit the shoe from moving relative to the hoof to assist accurate placement when attached thereto and also to interlock with the hoof material when nailed to the hoof wherein to inhibit nail shear during galloping movement.

2. Description of the Prior Art

The major purpose of a horseshoe is to protect the horse's hooves against injury and to aid traction. In a race horse, a properly designed horseshoe is an important piece of equipment which can enhance the horse's racing performance and can add years to the length of the horse's racing career. When a horse is running, its hooves hit the ground with a great deal of impact. This impact is transmitted through the shoed hoof and up through the horse's legs. Unless great care is taken to protect the horse's legs and hooves against impact, the horse can develop sore feet and lame legs due to corns, cracks, and other damage.

Further, it is known that the hooves of a horse exhibit a so-called hoof mechanism, which results in the rear half of the hoof to narrow, when the leg is lifted, and to expand, when the horse puts its leg down. A badly functioning hoof mechanism hampers blood circulation in the foot, which inhibits the formation of a healthy hoof. As such, the horse may experience soreness in its hooves and legs partially because a rigid horseshoe will inhibit the natural deformation of the hoof.

Although the horseshoe must be firmly attached to the hoof, desirably such securement would not impair the normal circulation of the horse's hooves.

Provision of unevenness in the hoof-engaging surface, at least in part, is known as an aid in preventing relative displacement between the hoof and the horseshoe. Illustrative are U.S. Pat. No. 142,097 to Goodenough and U.S. Pat. No. 6,729,411 to Kerckhaert, which patents are specifically incorporated herein.

Goodenough and Kerckhaert teach that the upper hoof engaging surface of a U-shaped horseshoe include a forward toe section, which has an unevenness, and a pair of legs, which extend rearwardly from the toe section and have no unevenness. The unevenness in the toe section prevents relative displacement between the hoof and the horseshoe.

In Goodenough, the unevenness is provided by an array of V-shaped sections, the sections formed by a pair of linear grooves. The V-shaped sections intersect and criss-cross one another to form a grid of square or box shaped indentations.

In Kerckhaert, the unevenness is provided by a plurality of straight parallel grooves, which extend from toe to heel in side-by-side relation, and in parallel relation to a central geometrical axis that bisects the U-shape of the horseshoe. While possibly suitable for the purposes intended, when the curved toe section at the front of the horseshoe impacts with the ground, the series of parallel, side-by-side longitudinally extending grooves may nonetheless permit the nailed connection between the horseshoe and the hoof to be subjected to an unacceptable shearing force (or lateral strain) acting between the toe and the heel.

Additionally, the portion of the hoof to which the horseshoe is attached is fibrous and will readily adapt to the irregularities of the hoof-engaging surface of the horseshoe when impacted thereagainst. An array of parallel side-by-side grooves may not provide support from lateral, transverse, or cross forces acting upon impact. This is believed to be a possible result arising from the fact that an undulating cross-section of like-shaped parallel grooves, in gripped relation with the uneven hoof material, may not uniformly distribute lateral and longitudinal hoof impact forces, combining to form a torque acting on the connection between the hoof and the horseshoe, arising from the horseshoe impacting the ground.

Accordingly, a primary objective of this invention is the provision of an improved horseshoe that obviates the disadvantages in the prior art.

An object of this invention is to provide the hoof engaging surface of a horseshoe with an unevenness which contacts the hoof wherein to lessen the likelihood of relative displacement between the shoe and the hoof, first to improve the ability of the farrier to locate the shoe relative to the hoof, and second to interlock with the hoof material during a gallop to inhibit horizontal forces from shearing the nails which fasten the shoe to the hoof.

An object of this invention is the provision of an anti-slip surface on the ground engaging surface of a horseshoe, the anti-slip surface in the form of an array of separated protuberances or cleats that project upwardly from the surface by a predetermined amount and become embedded into the hoof material.

An object of this invention is the provision of an anti-slip surface in the form of an array or separated like-shaped hemispherical bumps or spikes that project upwardly from a major portion of the hoof engaging surface of a U-shaped horseshoe to engage and displace hoof material around the bumps and create an interlocking interference therewith that inhibits rotation or sliding of the horseshoe relative to the hoof when nailed thereto and when the horse is galloping.

SUMMARY OF THE INVENTION

The present invention provides an improved horseshoe, which comprises a hoof engagement surface that is provided with an unevenness and makes contact with the hoof in such a manner that the shoe will fit more closely to and immovably against the bottom of the hoof. The unevenness provides an anti-slip interference with fibruous material of the hoof to lessen relative movement between the horseshoe and the hoof, both during assembly thereto by a farrier and during galloping of the horse, desirably inhibiting shearing stresses being placed on the securement nails. The anti-slip interference is provided by an array of bumps or hemispherical shaped domes that project upwardly from the hoof-engaging surface to displace fibrous hoof material and complete an interlocking engagement therewith in an amount sufficient to inhibit relative movement but not create discomfort to the horse.

More particularly, the present invention provides an improved horseshoe, the horseshoe comprising a rigid generally U-shaped body including an upper surface adapted to be fixed, in use, against the bottom surface of the horse's hoof and a lower ground engaging surface, said body formed by a rounded forward toe section and pair of legs extending rearwardly from the toe section, the improvement comprising the upper surface of said toe section being provided with an array of protuberances, each protuberance being adapted to engage and be embedded into interlocked relation with a predetermined amount of the material of the hoof when the shoe is secured thereto.

In particular, the protuberances are arranged in respective rows in side-by-side relation, the rows being generally angled in a toe to heel direction relative to a central axis that bisects the horseshoe into two like half-sections.

In one aspect, the array of protuberances on the half sections are mirror images of one another.

In another aspect, the protuberances in successive of a first, a second and a third row, respectively, are arranged in juxtaposed side-by side relation to one another.

In yet another aspect, the protuberances in successive of a first and third row are offset relative to respective protuberances in a second row intermediate to the first and third rows.

According to this invention, each protuberance is generally dome shaped, concave down, and has a circular base. In an aspect, the protuberances or cleats project generally perpendicularly from the hoof-engaging surface of the horseshoe.

In an embodiment thereof, the horseshoe includes inner and outer faces, each being generally U-shaped and extending between the ground engaging surface and the hoof engaging surface, each row of protuberances extending between the inner and outer faces with the inner face being angled relative to the shoe surfaces.

Further, the array of protuberances define a plurality of rows, each of the disposed in along respective of imaginary lines arranged generally equiangularly relative to the central axis of the U-shape.

According to another embodiment of this invention there is provided a horseshoe of the type having a substantially rigid element with a rounded front and rearward extending legs, and an upper surface which is intended, in use, for coming into contact with a hoof, the upper surface of said rounded front being bisected into like shaped halves and provided with unevenness in the form of an array of separate bumps, the bumps being arranged along a series of imaginary lines that are generally equiangularly disposed and extend in toe to heel direction with the bumps in one toe half being symmetrical to and the mirror image of the bumps in the other toe half, and the upper surface of said rearward extending legs being free of an unevenness.

According to this embodiment, the bumps are like shaped and project upwardly from the upper surface, the upward ed portion of each bump being adapted to engage and become embedded into the material of the hoof and displace hoof material downwardly and into engagement with bumps adjacent thereto.

Preferably, in each of the above, whether referred to as a protuberance, bump, cleat, spike and the like, the anti-slip surface engages the hoof material to prevent the shoe from sliding about relative to the hoof, whether when being nailed to the hoof by the farrier, and when nailed thereto and the horse is in a gallop. The cleat or bump will be embedded into the bottom of the hoof by a minor amount, so as to not apply a discomfort to the horse but yet displace enough hoof surface around the array of bumps to create an interference that will provide an interlocking engagement therewith.

In this regard, the cleat provides an engagement of about 0.008 inches.

The present invention will be more clearly understood with reference to the accompanying drawings and to the following Detailed Description, in which like reference numerals refer to like parts and where:

BRIEF DESCRIPTION OF THE DRAWINGS

FIG. 3 is a plan view of the hoof-engaging surface of the horseshoe of FIG. 1 and an anti-slip surface formed in the rounded toe section thereof, according to the present invention;

FIG. 4 is an enlarged view taken about line 4-4 of FIG. 1, showing a portion of the anti-slip surface of the horseshoe;

FIG. 5 is a section view, taken along line 5-5 of FIG. 3, showing detail of cleats that form the anti-slip surface of the horseshoe; and FIG. 6 is an enlarged view taken about line 6-6 of FIG. 3, of an alternate embodiment of an anti-slip surface formed in the rounded toe section of a horseshoe, according to the present invention.

DETAILED DESCRIPTION OF THE PREFERRED EMBODIMENT

Figures 1, 2:
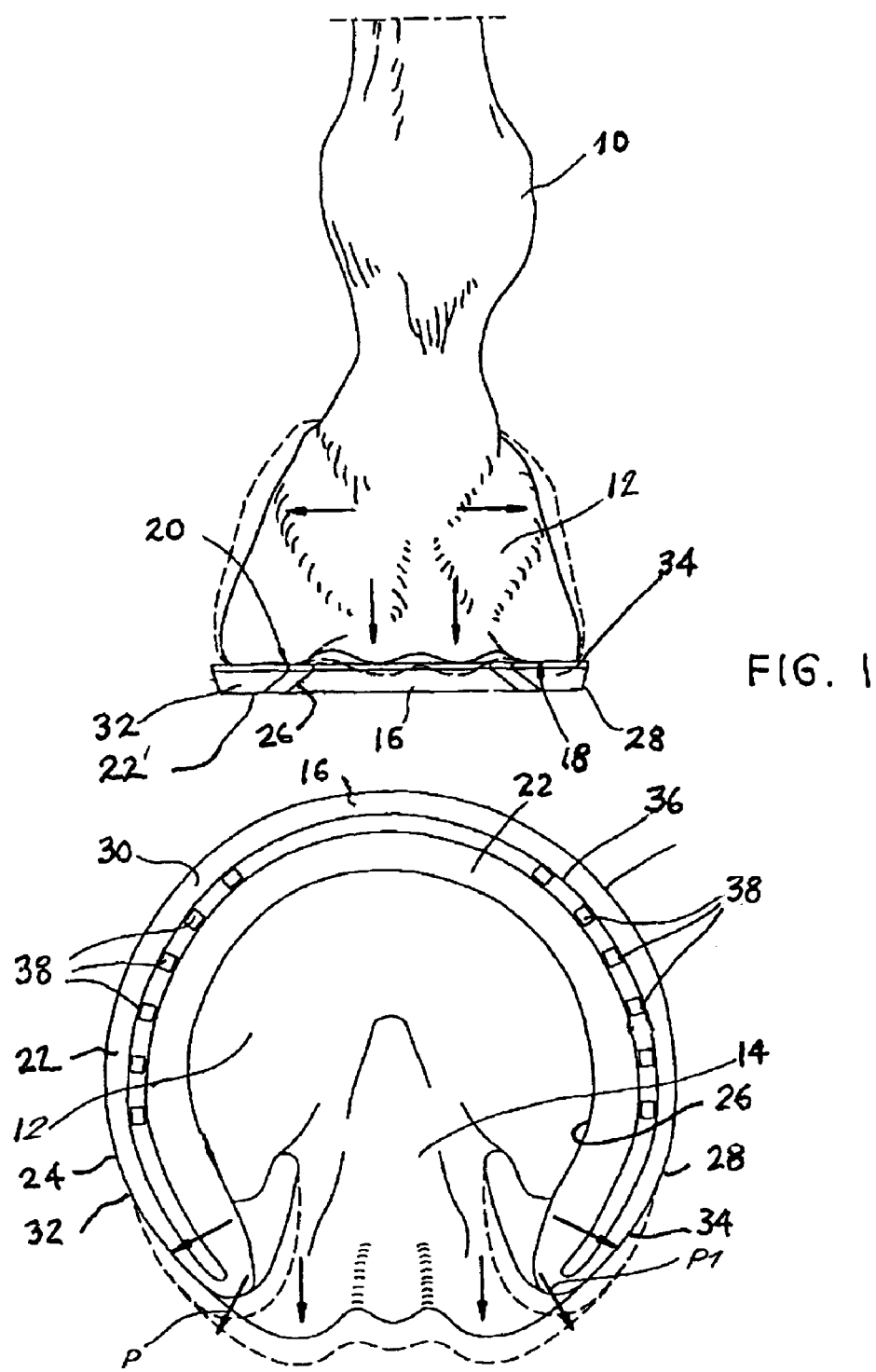
FIG. 1 represents the hoof of a horse and a horseshoe attached to the hoof.
FIG. 2 is bottom view of the shoed horse illustrated in FIG. 1.

Turning now to the drawings, FIGS. 1 and 2 illustrate a leg 10 with a hoof 12 of a hoofed animal, a hoof mechanism indicated at 14, and a horseshoe 16 attached to the sole 18 of the hoof 12, the circumference of which horseshoe 16 follows the circumference of the sole 18. The hoof mechanism is discussed in greater detail in the Kerckhaert patent. The horseshoe 16 includes an upper surface 20, which is fixed, in use, against the bottom surface or sole 18 and a lower surface 22, adapted to engage the ground. The surfaces 20 and 22 are generally planar and in parallel spaced relation to one another.

Further the horseshoe 16 comprises a rigid U-shaped body 24 with inner and outer faces 26 and 28 extending vertically between the upper and lower surfaces 20 and 22, a forward closed end toe section 30 and a pair of legs 32 and 34 extending rearwardly from the toe section. The ground engaging lower surface 22 is provided with a continuous groove or channel 36 and the horseshoe body 16 includes a plurality of bores 38, which extend between the upper surface 20 and open in the channel 36.

As shown best by reference to FIG. 3, the forward closed end toe section 30 and legs 32 and 34 are symmetrical relative to a centerline "C" through the body 24. The center line "C" divides the horseshoe 16 into two like-shaped wing portions and bisects the toe section 30 wherein to define a pair of rounded toe sections "A" and "B" from which one and the other leg 32 and 34 extends. A bevelled surface 39 tapers inwardly and downwardly between the upper surface 20 and the inner face 26

According to this invention, the hoof engaging upper surface 20 of the toe section 30, formed by the two sections "A" and "B", is provided with an anti-slip structure, generally indicated by the reference number 40. The anti-slip structure 40 comprises each half-section "A" and "B" being provided with a plurality of specifically configured cleats, domes or spike like protuberances 42. The protuberances 42 are spaced apart from one another and arranged in a specific array. The array of protuberances in the half section "A" and in the half section "B" are mirror images of one another relative to the centerline "C".

The domes or cleats 42 are arranged along respective imaginary lines, the lines are generally equiangularly spaced relative to the centerline "C" and extend in toe to heel direction, and the cleats 42 are distributed in spaced side-by-side relation along their respective lines.

Referring to FIG. 4, and an enlarged view of the anti-slip structure 40, a plurality of cleats 42 are arranged along various imaginary lines, such as a first line 44, a second line 46, a third line 48, a fourth line 50, and so on. The cleats 42 in the second line 46 are generally equidistantly spaced therealong relative to one another and between the outer face 28 and beveled inner face 39, and juxtaposed and equidistantly spaced to a corresponding cleat in the adjacent first and third row 44 and 50. Generally, as one progresses from the centerline "C" towards the heel, the lines become more acutely angled relative to the centerline "C".

Referring to FIG. 5, a row of cleats 42 is shown in greater detail. Preferably, each cleat 42 is substantially the same in size and shape. In the embodiment illustrated, the cleat 42 projects generally perpendicularly upward from a base 52 on the hoof engaging surface 20 and terminates in a rounded end portion 54. The cleat 42 is generally concave down, has a circular cross-section, and increases in diameter from the top end portion 54 to the base 52.

The end portions 54 are adapted to engage and become embedded within the fibrous material of the horse's hoof 12. While shown as being somewhat rounded, and in the nature of a hemispherical dome, the end portion 54 of the cleat 42 could be more pointed and spike like.

Each cleat 42 is separated from the next adjacent cleat, both relative to the cleats along the same imaginary line and the cleats juxtaposed therewith and on adjacent lines, by an amount 56. Respective sets of four contiguous cleats 42 form a box-like array and provide a receiving zone or entry throat into which displaced hoof material can be displaced when the cleats are clinched into the hoof. That is, the geometric centers and the respective axes of each of four contiguously adjacent cleats 42 form a square and the outer surfaces of the juxtaposed cleats form a narrowing throat for receiving displaced hoof material, such as forced thereinto during galloping movement of the hoof when the horseshoe is nailed thereto.

Preferably, whether referred to as a protuberance, bump, cleat, spike and the like, the anti-slip surface engages the hoof material to prevent the shoe from sliding about relative to the hoof, whether when being nailed to the hoof by the farrier, and when nailed thereto and the horse is in a gallop.

The cleat or bump will be embedded into the bottom of the hoof by a minor amount, so as to not apply a discomfort to the horse but yet displace enough hoof material into the throat formed around the array of bumps to create an interference that will provide an interlocking engagement therewith.

In this regard, the cleat provides an engagement of about 0.008 inches with the material of the hoof.

For the purposes of securement, the farrier positions the horseshoe against the ground-engaging surface of the hoof. The cleats are pressed against the hoof, causing the horseshoe to be maintained where desired relative to the hoof. The farrier then positions nails in the groove 36 and into the bores 38 and drives the nails into the hoof.

This driving securement drives the hoof-engaging surface 20 and the anti-slip surface 40 of the horseshoe into engagement with the ground engaging surface of the hoof. The cleats 42 form a firm seating by allowing the fibrous material of the hoof to adapt to and fill the depression zones or narrowing throats formed between the sets of cleats 42. That is, irregularities in the hoof surface are accommodated by the anti-slip structure 40 and the horseshoe may be closely and immovably fixed relative to the hoof.

Desirably, during galloping of the horse, such as upon a hardened surface, the fiber of the hoof will be caused to be forced into the throats formed between sets of contiguous cleats and increase the interlocked relation, and thereby render the horseshoe relatively immovable relative to the hoof. The cleats will inhibit rearward shear forces acting on the nailed securement.

Referring to FIG. 6, another embodiment of an anti-slip structure according to this invention, indicated by the number 140, is provided on the hoof-engaging surface of the horseshoe shown in FIG. 3. The anti-slip structure 140 is similar to that described above and comprises a plurality of upwardly projecting cleats or dome like bumps 42. The cleats are disposed in an array and along respective lines in spaced relation to one another.

According to this embodiment, the spaced apart cleats 42 in one line 146 are offset and nested in the space between corresponding spaced apart cleats 42 in the preceding line 144 and nested in the space between corresponding spaced apart cleats in the succeeding line 148. In this approach, the cleats are arranged in sets such that the geometric centers of four contiguous cleats form a parallelogram, rather than a square. This parallelogram array of cleats forms a throat, which is somewhat narrower for receiving the hoof material forced thereinto, such as during a gallop.

The horseshoe is of a rigid material. While the horseshoe is preferably of a suitable aluminum or steel, other materials may be employed, such as tough polymers, elastomers, and other metals and or composite thereof.

The present horseshoe may be used in connection with race horses, trotters as well as jumpers.

It should be further noted that the present cleats can have a geometric configuration other than circular, such as, for example, rectangular, elliptical, triangular, as well as having an irregular shape, and the like.

Having, thus, described the invention, what is claimed is:
1. A horseshoe, comprising:
(a) a rigid generally U-shaped body including an upper surface which engages the bottom surface of the horse's hoof and a lower ground engaging surface, said body formed by a rounded forward toe section and pair of legs extending rearwardly from the toe section, (b) an anti-slip surface comprising an array of protuberances, disposed on the upper surface of the toe section each protuberance being adapted to engage and be embedded into interlocked relation with a predetermined amount of the material of the hoof when the shoe is secured thereto and wherein each protuberance is generally dome shaped, concave down, and has a circular base, each protuberance being substantially perpendicular to the hoof-engaging surface of the horseshoe.

2. The horseshoe of claim 1 wherein the protuberances are arranged in respective Rose in side-by-side relation, the Rose being generally angled in a toe to heel direction relative to a central axis that bisects the horseshoe into two like halfsections.

3. The horseshoe of claim 2 wherein the array of protuberances on the half sections are minor images of one another.

4. The horseshoe of claim 1, wherein the protuberances are arranged in Rose, and further wherein successive of a first, a second and a third row, respectively, are arranged in juxtaposed side-by side relation to one another.

5. The horseshoe of claim 4, wherein the protuberances in successive of a first and third row are offset relative to respective protuberances in a second row intermediate to the first and third Rose.

6. The horseshoe of claim 1, wherein the horseshoe includes inner and outer faces, each being generally U-shaped and extending between the ground engaging surface and the hoof engaging surface, the anti-slip surface comprising an array of the protuberances arranged in Rose each row of protuberances extending between the inner and outer faces with the inner face being angled relative to the shoe surfaces.

7. The horseshoe of claim 1, wherein the array of protuberances define a plurality of Rose, each of the Rose disposed along respective of imaginary lines arranged generally equi-angularly relative to the central axis of the U-shape.

8. The horseshoe of claim 1, wherein the ground engaging lower surface is provided with a continuous groove, the horseshoe body including a plurality of bores which extend between the upper surface and open in the ground engaging surface.

9. The horseshoe of claim 1, wherein the horseshoe is divided into two like-shaped wing portions to define a pair of rounded toe sections, the horseshoe further comprising a beveled surface which tapers inwardly and downwardly between the upper surface and an inner face of the ground engaging surface.

10. The horseshoe of claim 1, wherein each protuberance increases in diameter from its top end portion to its base.

11. The horseshoe of claim 1, wherein each protuberance has a geometric center and an axis, the geometric centers and the respective axes of each of four contiguously adjacent protuberances form a square and the outer surfaces of the juxtaposed protuberances form a narrowing throat for receiving displaced hoof material.

12. The horseshoe of claim 1, wherein the protuberances are spaced apart and arrayed in lines the spaced apart protuberances in one line being offset and nested in the space between corresponding spaced apart protuberances in the preceding line and nested in the space between corresponding spaced apart protuberances in the succeeding line such that the protuberances are arranged in sets, whereby the geometric centers of four contiguous protuberances form a parallelogram.

13. The horseshoe of claim 1, wherein each protuberance has a geometric center and an axis the geometric centers and the respective axes of each of four contiguously adjacent protuberances form a rectangle and the outer surfaces of the juxtaposed protuberances form a narrowing throat for receiving displaced hoof material, when the horseshoe is nailed thereto.

14. A horseshoe of the type having a substantially rigid element with a rounded front and rearward extending legs, and an upper surface which contacts a hoof of a horse, the upper surface of said rounded front being bisected into like shaped halves and provided with unevenness in the form of an array of separate bumps, the bumps being arranged along a series of imaginary lines that are generally equiangularly disposed and extend in toe to heel direction with the bumps in one toe half being symmetrical to and the minor image of the bumps in the other toe half, and the upper surface of said rearward extending legs being free of an unevenness, the bumps being like-shaped and project upwardly from the upper surface, the upward end portion of each bump being adapted to engage and become embedded into the material of the hoof and displace hoof material downwardly and into engagement with bumps adjacent thereto and further wherein each protuberance is generally dome shaped, concave down, and has a circular base, each protuberance being substantially perpendicular to the hoof-engaging surface of the horseshoe.

* * * * *

UNITED STATES PATENT AND TRADEMARK OFFICE
CERTIFICATE OF CORRECTION

| | |
|---|---|
| PATENT NO. | : 8,118,107 B2 |
| APPLICATION NO. | : 12/428504 |
| DATED | : February 21, 2012 |
| INVENTOR(S) | : Robert W. Coulombe |

It is certified that error appears in the above-identified patent and that said Letters Patent is hereby corrected as shown below:

Col. 6 in the second line of Claim 2, each occurrence of "Rose" should read --rows--.

Col. 6 in the second line of Claim 4, "Rose" should read --rows--.

Col. 7 in the fourth line of Claim 5, "Rose" should read --rows--.

Col. 7 in the fifth line of Claim 6, "Rose" should read --rows--.

Col. 7 in the second line of Claim 7, each occurrence of "Rose" should read --rows--.

Signed and Sealed this
Twenty-seventh Day of November, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,118,107 B2 | Page 1 of 1 |
| APPLICATION NO. | : 12/428504 | |
| DATED | : February 21, 2012 | |
| INVENTOR(S) | : Robert W. Coulombe | |

It is certified that error appears in the above-identified patent and that said Letters Patent is hereby corrected as shown below:

Column 6, line 58 (Claim 2, line 2) each occurrence of "Rose" should read --rows--.

Column 6, line 65 (Claim 4, line 2) "Rose" should read --rows--.

Column 7, line 4 (Claim 5, line 4) "Rose" should read --rows--.

Column 7, line 9 (Claim 6, line 5) "Rose" should read --rows--.

Column 7, line 13 (Claim 7, line 2) each occurrence of "Rose" should read --rows--.

This certificate supersedes the Certificate of Correction issued November 27, 2012.

Signed and Sealed this
First Day of January, 2013

David J. Kappos
*Director of the United States Patent and Trademark Office*